United States Patent Office 3,219,670
Patented Nov. 23, 1965

3,219,670
GLYCIDYL ETHERS OF POLY(HYDROXY-PHENOXY) AROMATIC COMPOUNDS
Carl M. Smith, White Bear Lake, Minn., assignor to Minnesota Mining and Manufacturing Company, St. Paul, Minn., a corporation of Delaware
No Drawing. Filed Sept. 29, 1961, Ser. No. 141,603
6 Claims. (Cl. 260—348)

This invention relates to polyglycidyl ethers and particularly to compounds possessing glycidoxyphenoxy groups attached to aromatic nuclei and to polymers produced therefrom.

It is an object of this invention to prepare certain curable (polymerizable) glycidyl ethers and particularly to provide compounds possessing at least two reactive glycidyl groups. A further object is to provide certain novel polyphenols which are convertible to epoxy resin prepolymers. Other objects will become evident hereinafter.

In accordance with these and other objects of the invention, it has been found that certain polyphenols having the formula:

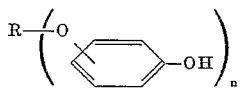

wherein R is an n-valent radical selected from the group consisting of phenylene, phenenyl, biphenylene and diphenylether radicals, and $n$ is 2 or 3, multiple oxygen-carbon valencies on any one ring being attached to nonadjacent carbon atoms, can be reacted with an epihalohydrin to produce novel glycidyl ethers. The term phenenyl is employed to designate a radical of the benzene nucleus having three available valencies, according to standard terminology.

The resulting glycidoxyphenoxy-substituted aromatic compounds can be cured by conventional means to hard epoxy resins having outstanding strength and toughness. These compounds, which may also be termed glycidoxy polyaryl ethers, have the structural formula:

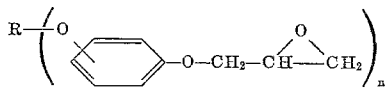

wherein R and $n$ have the same significance as set forth above, valencies from oxygen to carbon atoms of a single ring are attached to non adjacent carbon atoms.

Illustrative of the polyphenols coming within the scope of the formula, and the polyglycidoxy phenoxy substituted aromatic compounds derived therefrom, are:

Broadly speaking, the prepolymers of this invention are formed by reaction of epichlorohydrin with the selected polyphenol in the presence of a strong alkali, such as sodium hydroxide or the like. The resulting polyglycidoxy-phenoxy compounds range in properties from viscous liquids to solids which are indefinitely stable. The solids usually melt to form easily flowable liquids at convenient working temperatures.

It is possible to vary the precise nature of these glycidoxy-phenoxy compounds within certain limits by employing greater or smaller excesses of epichlorohydrin in the reaction with the selected bis-phenols. The resulting compounds are illustrated, when bisphenols are employed, by compounds which have the formula:

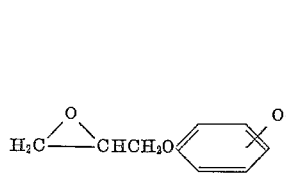 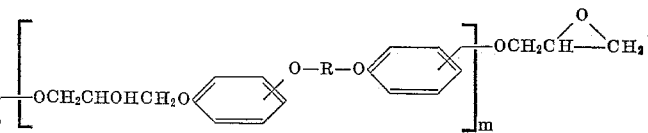

wherein R has the same significance as hereinabove and $m$ is a small whole number from about zero to 3. When $m$ is zero, the formula reduces to that set forth above wherein $n$ is 2. When large excesses of epichlorohydrin are employed, the value of $m$ approaches 0, and when more nearly equimolar amounts are used the value of $m$ is higher, up to about 3 and such compounds approach the characteristics of epoxy resin prepolymers. The number $m$ is of course to be understood as signifying an average value, since these epoxy compounds as prepared contain molecules having various numbers of repeating units from $m=0$ up to $m=3$ or even higher. The number of repeating units influences the physical properties of the resin, but does not have a deleterious effect upon the toughness of the cured products. When compounds of higher $m$ values are present, the mixtures are found to be quite hard resins which do not flow readily on heating and are hence less desirable for purposes which require casting, pouring or impregnation operations. For such purposes it is preferred to employ compounds in which $m$ is not greater than about 1. It is found, however, that prepolymers in which $m$ is greater than about 1 provide excellent bases for solvent diluted coatings having good stability and toughness.

The glycidoxyphenoxy compounds and prepolymers of this invention are cured to solid thermoset polymers by heating mixtures comprising the epoxy compound and a curing agent in stoichiometric proportions, according to the methods known to the art. Because of the high molecular weight of the prepolymers of this invention, they are employed in relatively high proportions by weight with respect to the curing agent used, as compared to conventional prepolymers. However, the relative amounts of curing agent required are calculated in the usual fashion from oxirane content and the molecular weight of the crosslinking curing agent.

| Polyphenol | Polyglycidoxy compound |
|---|---|
| 1,3-bis(3-hydroxyphenoxy)benzene ⟶ | 1,3-bis(3-glycidoxyphenoxy)benzene. |
| 1,4-bis(3-hydroxyphenoxy)benzene ⟶ | 1,4-bis(3-glycidoxyphenoxy)benzene. |
| 1,3-bis(4-hydroxyphenoxy)benzene ⟶ | 1,3-bis(4-glycidoxyphenoxy)benzene. |
| 1,4-bis(4-hydroxyphenoxy)benzene ⟶ | 1,4-bis(4-glycidoxyphenoxy)benzene. |
| p,p'-Bis(3-hydroxyphenoxy)diphenyl ether. ⟶ | p,p'-Bis(3-glycidoxyphenoxy)diphenyl ether |
| p,p'-Bis(4-hydroxyphenoxy)diphenyl ether. ⟶ | p,p'-Bis(4-glycidoxyphenoxy)diphenyl ether. |
| p,p'-Bis(3-hydroxyphenoxy)biphenyl ⟶ | p,p'-Bis(3-glycidoxyphenoxy)biphenyl. |
| p,p'-Bis(4-hydroxyphenoxy)biphenyl ⟶ | p,p'-Bis(4-glycidoxyphenoxy)biphenyl. |
| 1,3,5-tris(3-hydroxyphenoxy)benzene ⟶ | 1,3,5-tris(3-glycidoxyphenoxy)benzene. |
| 1,3,5-tris(4-hydroxyphenoxy)benzene ⟶ | 1,3,5-tris(4-glycidoxyphenoxy)benzene. |

Numerous curing agents for epoxy compounds are known and available, and these are described together with the method for calculating the amount to be used in the book by Lee and Neville, "Epoxy Resins," 1957, McGraw-Hill Book Company, New York, pages 36 to 140, inclusive. Useful curing agents include amines such as ethylene diamine, diethylene triamine, triethylene tetramine, piperidine, and the like, diaminodiphenylsulfone, dicyandiamide, organic acids such as oxalic acid and acid anhydrides such as phthalic anhydride, maleic anhydride, dichloromaleic anhydride, chloroendic anhydride, and the like. The curing agents can be characterized as agents capable of crosslinking oxirane groups and can be considered as forming a class comprising, e.g., amines, organic acids and acid anhydrides.

Catalytic agents, such as $BF_3$-amine complexes, benzyl dimethylamine, trimethylamine, and the like, can also be used to homopolymerize the prepolymers. In such cases, of course, relatively small amounts of the catalysts are used and a homopolymerization is effected with greater or less crosslinking.

The glycidoxy compounds and prepolymers according to the invention are readily cured by heating them in admixture with the curing agent. However, the prepolymers tend to be of somewhat higher melting point than the prior art prepolymers and thus when high-melting curing agents, such as chlorendic anhydride, are employed, the heated mixture may have a relatively short pot life and may cure with somewhat higher exotherm. In such cases curing can be advantageously carried out by dissolving the prepolymer and the curing agent in a mutual inert solvent. The solution can be used as a coating which cures in place, or for lay-up of laminated structures.

Having described the invention in broad general terms it is now specifically illustrated by examples showing the best mode contemplated of practicing this invention, but which are not to be construed as limiting the scope thereof. In these examples all parts are by weight unless otherwise specified.

EXAMPLE 1

In a vessel heated in an oil bath and provided with mechanical stirrer, thermometer, nitrogen inlet and adaptor for downward distillation are placed 100 parts (4.33 moles of m-methoxy-phenol, 30 parts (2.9 moles) of potassium hydroxide pellets, 60 parts (1 mole) of p,p'-dibromodiphenyl ether and 0.1 part of very fine copper powder (available from Mattheson, Coleman and Bell under number CB963). Nitrogen is used to flush the equipment and a small stream is maintained throughout. The mixture is stirred and heated up to about 220° C. for about 75 minutes, and then maintained at about 225° to 230° C. for a further 90 minutes. Without cooling, the hot mixture is poured into 1500 parts of 5% aqueous sodium hydroxide solution. The suspension is filtered through diatomaceous earth to remove finely divided suspended material, e.g. copper hydroxide, and extracted with about 3 successive 100 ml. portions of methylene chloride to separate the product. The extract is washed with two 200 ml. portions of 5% sodium hydroxide and dried overnight over potassium hydroxide pellets. The methylene chloride is stripped off and the residue distilled under about 0.1 mm. of Hg pressure into two forerun fractions up to 50° C. and between 50° and 191° C., and four fractions of product boiling between 191° and 231° C. After distillation of the combined product fractions, the p,p'-bis-(3-methoxyphenoxy) diphenyl ether thus obtained boils at about 230° C. at about 0.07 mm. of Hg pressure. The main fraction has substantially constant boiling point and refractive index $n_D^{25}=1.6147$.

*Analysis.*—Calculated for $C_{26}H_{22}O_5$: 75.35% C; 5.35% H; W.W. 414 Found: 74.9% C; 5.5% H; M.W. 410 (in $CHCl_3$).

The p,p'-bis(3-methoxyphenoxy) diphenyl ether is converted to p,p'-bis(3-hydroxyphenoxy) diphenyl ether by heating with pyridine hydrobromide as follows.

Pyridine hydrobromide is prepared by mixing 1100 parts by volume of 48% hydrobromic acid with 700 parts by volume of pyridine in an open vessel followed by heating until the temperature of the melt reaches 200° C.

In a suitable vessel open to the atmosphere are placed 155 parts by weight of the above pyridine hydrobromide and 49.5 parts of the above p,p'-bis(3-methoxyphenoxy) diphenyl ether. The mixture is heated, suitably on an electric hot plate, to an internal temperature of 235° to 240° C. (thermometer in the reaction mixture) while stirring and after 10 minutes the temperature is further raised to 270° to 275° C. (requiring 5 minutes). The mixture is maintained at this temperature for 15 minutes and is then poured into about 1000 parts of cold water. A dark oil separates which crystallizes after standing about 18 hours. The aqueous layer is decanted and discarded and the crystalline product is broken up in mortar, slurried with water, collected on a filter and washed with further water and finally dried in the air. The crude material is recrystallized from xylene, employing diatomaceous earth to assist in removing oily contaminants. The resultant slightly pink crystalline p,p'-bis(3-hydroxyphenoxy) diphenyl ether melts at about 131° to 134.5° C. It is converted to the corresponding bis-glycidyl ether of the invention as follows.

A reaction vessel fitted with thermometer, stirrer, addition funnel, distillation head and means for flushing with nitrogen is charged with 300 parts by volume of epichlorohydrin and 28.5 parts by weight of the above p,p'-bis(3-hydroxyphenoxy) diphenyl ether, and about 25 parts of epichlorohydrin are distilled off to remove water. The remaining mixture is allowed to cool to about 88° C., the nitrogen stream is commenced and 44.5 parts by volume of 4 N NaOH solution in methanol (containing 7.08 parts by weight of sodium hydroxide, a 25% excess over stoichiometric), is added slowly over about 70 minutes while heating is maintained sufficient to distil off the methanol. Heating and distillation are continued for an hour longer while the pot temperature rises to about 114° C. The mixture is then cooled and filtered to remove sodium chloride. The filtrate is then stripped of excess epichlorohydrin on a rotary film evaporator until the temperature reaches 140° C. at 16 mm. of mercury pressure, to give p,p'-bis(3-glycidoxyphenoxy) diphenyl ether as a brownish, viscous fluid prepolymer. Analysis shows the presence of 0.3% active chlorine representing unremoved epichlorohydrin. The oxirane content is found to be 6.3%; calculated, 6.42%.

The epichlorohydrin in the foregoing process can be replaced with about 400 parts of epibromohydrin, to produce the p,p'-(3-glycidoxyphenoxy) diphenyl ether.

EXAMPLE 2

Essentially the procedure of Example 1 is employed to make p,p'-bis(4-glycidoxyphenoxy) diphenyl ether.

In a suitably fitted vessel are placed 267 parts of p-methoxyphenol, 100 parts of p,p'-dibromodiphenyl ether, 71.5 parts of potassium hydroxide pellets and 0.2 part of purified copper powder. The mixture is heated up to 195° C. during 2 hours under a stream of nitrogen to remove water. Thereafter, the temperature is raised to 220° C. over about 50 minutes and held at 220° to 225° C. for 2 hours. The hot reaction mixture is poured into about 2000 parts of 5% aqueous sodium hydroxide solution, and the resulting suspension is cooled. The product crystallizes and is collected on a filter, washed first with small portions of 5% sodium hydroxide and then with water until substantially neutral and air dried. The crude p,p'-bis(4-methoxyphenoxy) diphenyl ether thus obtained melts at 140° to 160° C. It is distilled without fractionation under about 0.1 to 0.2 mm. of mercury pressure and then melts at about 155° to 161° C. Digesting a small portion in 95% ethanol raises the melting point to about 167.5° to 169.5° C. Recrystallization from ethyl acetate:benzene (2 to 1 by volume at 15 cc. solvent mixture per gram solute) for analysis further raises the melting point to about 169.8° to 170.5° C.

*Analysis.*—Calculated for $C_{26}H_{22}O_5$: 75.35% C; 5.35% H; M.W. 414.4. Found: 75.4% C; 5.4% H; M.W. 402 (in $CHCl_3$).

To 450 parts of pyridine hydrobromide at 210° C. in a suitable open vessel are added 84.1 parts of vacuum distilled p,p'-bis(4-methoxyphenoxy) diphenyl ether and the mixture is stirred. The internal temperature rises in about 18 minutes to 234° C. An aliquot is then found to be completely soluble in dilute sodium hydroxide. The reaction mixture is poured into cold water with stirring and after cooling the white crystalline precipitate which forms is collected, washed thoroughly with water and dried first in air and then in vacuo. Recrystallization from o-dichlorobenzene gives the bisphenol, p,p'-bis(4-hydroxyphenoxy) diphenyl ether having a melting point of about 204.5° C. to 207.0° C.

Conversion of the bisphenol to the corresponding bisglycidyl ether is effected by a procedure similar to that set forth hereinabove.

A mixture of 57.0 parts by weight (0.148 mole) of the above p,p'-bis(4-hydroxyphenoxy) diphenyl ether and 450 parts by volume of epichlorohydrin is heated while adding 88.5 parts by volume of 4 N methanolic sodium hydroxide (containing 14.15 parts by weight of sodium hydroxide; a 20% excess) over a period of about 90 minutes, while removing methanol by distillation. Distillation and heating are continued for one hour further so that a total of about 165 parts by volume of distillate is collected and the pot temperature rises to 112° C. On standing over night the product crystallizes from the excess epichlorohydrin, along with the sodium chloride formed in the reaction. The solids are collected, washed with a small amount of acetone and then extracted with acetone in a Soxhlet extractor. On cooling the acetone extract, p,p'-bis(4-glycidoxyphenoxy) diphenyl ether crystallizes as pearly flakes melting at about 170.5° to 172.5° C. It is found to contain 6.3% oxirane oxygen. The calculated value is 6.42%.

EXAMPLE 3

In a suitable vessel as described above are placed 60 parts of p,p'-dibromobiphenyl, 160 parts of p-methoxy phenol, 106 parts of potassium carbonate (pulverized in a ball mill and dried at 180° C.) and 0.4 part of copper powder. The mixture is heated under nitrogen atmosphere to 220° C. during one hour and is held at 220 to 230° C. for 5½ hours so that water formed in the reaction can distil out. The hot reaction mixture is poured with stirring into 1500 parts by volume of 5% aqueous sodium hydroxide solution. The finely divided suspended product is decanted from the larger lumps and collected on a filter, the lumps being ground with aqueous sodium hydroxide and then added to the collected precipitate. The filter cake is reslurried with aqueous sodium hydroxide, collected, washed with water until the washings are neutral, and dried at 120° C. After three recrystallizations from xylene, the p,p'-bis(4-methoxyphenoxy) biphenyl thus prepared melts at about 213° to 214° C.

*Analysis.*—Calculated for $C_{26}H_{22}O_4$: 78.37% C; 5.57% H; M.W. 398. Found: 78.1% C; 5.9% H; M.W. 400.

In an open vessel are placed 7.5 parts of p,p'-bis(4-methoxyphenoxy) biphenyl recrystallized once (from xylene) and 50 parts of pyridine hydrobromide. The mixture is heated rapidly to an internal temperature of 235° 240° C. while stirring, held in this range for 5 minutes and poured into about 200 parts of cold water. The resulting slurry is heated to boiling and filtered hot. The filter cake is washed with hot water, dissolved in about 200 parts of 5% aqueous sodium hydroxide at about 70° C. and the solution clarified and then acidified. The bisphenol, p,p'-bis(4-hydroxyphenoxy) biphenyl, separates as fine plates which are collected, washed and dried. The crude material melts at about 244° to 248° C. One recrystallization from diethylbenzene raises the melting point to about 248° to 250° C.

*Analysis.*—Calculated for $C_{24}H_{18}O_4$: 77.82% C; 4.90% H. Found: 77.3% C; 5.5% H.

The bisphenol is converted to the corresponding bisglycidyl ether as follows. A mixture of 46.0 parts by weight (0.124 mole) of p,p'-bis(4-hydroxyphenoxy) biphenyl and 450 parts by volume of epichlorohydrin is heated at 80° to 95° C. in a distillation apparatus while adding 74.5 parts by volume of 4 N methanolic sodium hydroxide (.298 mole of NaOH) over a period of 55 minutes and removing methanol by distillation. Heating is continued and a total of 145 parts by volume of distillate is collected during an hour while the pot temperature rises to 112° C. The reaction mixture is allowed to cool to room temperature over about 15 hours. The bisglycidyl ether crystallizes from the excess of epichlorohydrin and is collected together with sodium chloride formed during the reaction on a filter. The cake is extracted with acetone in a Soxhlet extractor. On cooling the acetone extract, p,p'-bis(4-glycidoxyphenoxy) biphenyl crystallizes in shiny plates. It melts at 214.0° to 215.0° C.

*Analysis.*—Calculated for $C_{30}H_{26}O_6$: 74.7% C; 5.43% H; 6.63% oxirane O. Found: 74.7% C; 5.5% H; 6.4% oxirane O.

EXAMPLE 4

This example illustrates the preparation of a trisglycidyl ether of the invention.

A mixture of 50 parts of 3-methoxyphenol, 25.9 parts of 1,3,5-tribromobenzene, 15.0 parts of potassium hydroxide pellets and 0.50 part of copper metal powder is heated for 4 hours at 204° to 208° C. using the procedure described hereinabove. The resultant 1,3,5-tri(m-methoxyphenoxy) benzene is isolated by dissolving the reaction mixture in toluene, filtering the solution to remove undissolved solids, stirring the filtrate with sodium hydroxide pellets and then stripping off the toluene and fractionally distilling the residue under reduced pressure. 1,3,5-tris(methoxyphenoxy) benzene is a pale yellow viscous oil boiling at 237° to 242° at 0.03 mm. Hg pressure with refractive index $n_D^{25}=1.6112$.

Demethylation is effected by heating 19.25 parts of the tris-methyl ether with 122 parts of pyridine hydrobromide as prepared in Example 1 for 40 minutes at 225° to 230° C., followed by pouring the mixture into 600 parts by volume of cold water. The dark brown oily layer is taken up in ether and the phenol is extracted with 10% aqueous sodium hydroxide (200 parts by volume in three portions). The alkaline extracts are acidified and extracted with ether. The ethereal extract is concentrated on a rotary evaporator at 1 mm. Hg pressure to give 1,3,5-tris(m-hydroxyphenoxy) benzene as a brown tacky viscous resinous substance.

The trisphenol is converted to the corresponding trisglycidyl ether by the procedure described above using 50 parts of trisphenol, 300 parts by volume of epichlorohydrin and 119 parts by volume of 3.87 N methanolic sodium hydroxide, the latter being added over a period of 1.5 hours followed by heating for a further 15 minutes. 1,3,5-tris(3-glycidoxyphenoxy) benzene is soluble in the excess of epichlorohydrin and is recovered by filtering to remove solid sodium chloride from the solution, followed by stripping off excess epichlorohydrin under reduced pressure. The 1,3,5-tris-(3-glycidoxyphenoxy) benzene thus obtained is a dark honey-colored viscous resin.

*Analysis.*—Calculated: 8.58% oxirane O. Found: 7.8% oxirane O; 0.2% active Cl.

EXAMPLE 5

This example illustrates the preparation of 1,4-bis(3'-methoxyphenoxy) benzene and the formation of the bisglycidyl ether therefrom by essentially the procedure of Example 1.

In a 500 ml. 3-necked round bottom flask fitted with stirrer, thermometer, nitrogren inlet and Dean-Stark trap and reflux condenser are charged 56 parts (0.452 mole) of meta methoxy phenol, 17 parts (0.33 mol) of potassium hydroxide and 25 parts by volume of toluene. The Dean-Stark trap is primed with a further 25 parts by volume of toluene. The flask is then immersed in an electrically heated oil bath at 140° C. The temperature of the oil bath is raised gradually to 180° and the water from the reaction is collected in the Dean-Stark trap. When no more water distils, the oil bath is lowered, the flask contents allowed to cool to 150° C. and 1.8 parts of cupric carbonate and 39 parts (0.165 mole) of para-dibromobenzene are added under a stream of nitrogen. The oil bath is then replaced around the flask and the oil bath temperature is raised gradually to 210° over a period of 2 hours. After standing overnight heating is continued at 212–18° C. for 160 minutes. The reaction mixture is cooled, diluted with 200 parts by volume of toluene with stirring and filtered to remove salts. The filter cake is washed with toluene and the filtrate and washes extracted with three portions of 50 parts by volume of 10% sodium hydroxide. The toluene phase is stirred for about 2 hours with solid sodium hydroxide pellets, filtered and stripped on a rotary evaporator under water pump vacuum to give 44.7 parts of a dark viscous liquid which is fractionally distilled at about 0.02 mm. of Hg pressure. Cuts boiling from about 172° to 187° C. crystallize and are combined and recrystallized from 100 vols. of hexane to give 20.7 parts of colorless crystals of 1,4-bis(3'-methoxy phenoxy) benzene melting at 71.5° to 72.5° C.

Calculated for $C_{20}H_{18}O_4$: M.W. 322.3. Found: (In chloroform): 325.

In a 2-necked flask fitted with a thermometer and a short column, distilling head and thermometer on top and set in a mantle are charged 30 parts of the above 1,4-bis(3'-methoxy phenoxy) benzene, 60 parts by volume of pyridine and 93.5 parts by volume (stoichiometric amount) of 48% hydrobromic acid. The reaction mixture is heated rapidly to a pot temperature of 216° and then from 216° C. to 224° C. in 10 minutes with removal of distillate. After a further 45 minutes at 224° pot temperature the reaction mixture is completely soluble in base. The hot reaction mixture is then poured into 500 parts of distilled water to give an oil which rapidly crystallizes to a pink solid. The solid is collected and reprecipitated from dilute base by acidification with hydrochloric acid. The product 1,4-bis(3'-hydroxyphenoxy) benzene is collected, washed several times in water and dried in a vacuum dessicator and melts at about 121° to 125° C.

In a 3 necked flask set in a heating mantle and fitted with stirrer, thermometer, addition funnel and short Vigreux column with distillation head on top and nitrogen inlet are charged 300 volumes of epichlorohydrin and 24.6 parts of the above 1,4-bis(3'-hydroxyphenoxy) benzene. The solution is heated to 87° C. at which temperature addition of 60 volumes of 4 N methanolic sodium hydroxide is commenced. Addition requires 90 minutes during which time the temperature remains at 87° to 90° C. while methanol distils at about the same rate as that at which the alkaline solution is added. The reaction mixture is heated for one hour further and then is cooled and filtered to remove salt. The filter cake is washed with acetone and the filtrate and wash are stripped on a rotary evaporator at 90° constant weight. The product 1,4-bis(3'-glycidoxyphenoxy) benzene solidifies to a mush which becomes completely solid on cooling. Melting range 84° to 135° C.

Calculated for oxirane O: 7.86%.
Found:
   Oxirane O: 7.84%;
   Active chlorine: 0.2%.

EXAMPLE 6

The epoxy compounds made as described in Examples 1 to 4 and a conventional epoxy resin prepolymer are formulated on a three roll paint mill with curing agents to produce curable compositions employing the proportions shown in Table 1 in which amounts are indicated as parts by weight and curing at 330° F. for 1 hour at 25 p.s.i. bond pressure. Shear tests are performed on an Instron test machine according to test method ASTM–D–1002–53T and the overlap shear tensile strength in lbs./sq. in. at various temperatures are as shown in Table 2. The exceptional strength of the cured resins produced from the glycidyl ether of Example 1 as particularly notable and is indicative of superior toughness.

*Table 1*

| Parts by weight Composition | A | B | C | D | E | F |
|---|---|---|---|---|---|---|
| Ether of Example 1 p,p'-bis (3-glycidoxyphenoxy) diphenyl ether | 100 | 50 | | | | |
| Ether of Example 2: p,p'-bis (4-glycidoxyphenoxy) diphenyl ether | | | 50 | | | |
| Ether of Example 3: p,p'-bis (4-glycidoxyphenoxy) biphenyl | | | | 50 | | |
| Ether of Example 4: 1,3,5-tris (3-glycidoxyphenoxy) benzene | | | | | 100 | |
| Conventional epoxy resin prepolymer from bisphenol A | | 50 | 50 | 50 | | 100 |
| Isophthalyl dihydrazide | 19.5 | 21.4 | 22.2 | 22.2 | 23.7 | 14.5 |
| "Cab-O-Sil" (amorphous silica) | 5.0 | 5.0 | 5.0 | 5.0 | 5.0 | 5.0 |

*Table 2*

| Composition | Overlap Shear Tensile Test | | | | | |
|---|---|---|---|---|---|---|
| | A | B | C | D | E | F |
| −67° F | 4,325 | 3,600 | 3,390 | 2,210 | 2,550 | 2,660 |
| Room Temp. (Ca. 80° F.) | 5,300 | 4,000 | 3,340 | 2,000 | 2,860 | 3,200 |
| 180° F | 6,400 | 5,100 | 4,050 | 1,860 | 3,400 | 4,000 |
| 250° F | 3,400 | 4,700 | 3,000 | 1,780 | 2,850 | 3,300 |
| 300° F | 1,520 | 1,490 | 2,140 | 1,720 | 2,300 | 2,000 |
| 350° F | 1,120 | | | | | 1,700 |
| 400° F | 430 | | | | | 700 |

Further tests on compositions A through F serve to show the superiority of the resins of the invention. One inch wide by 0.063 inch thick aluminum strips are bonded for ½ inch overlap using compositions A through F and cured for 1 hour at 330° F. On cooling it is found that the strips bonded by composition A can be bent 180° (doubled over) without fracture of the bond whereas the control bonded by composition F fractures by the time there has been as much as a 15° bend.

Cylinders ½ inch long and ¼ inch diameter are prepared from compositions A and F cured as before and are subjected to 25% compression by an Instron test machine at a crosshead speed of 20 inches per minute. This approximates a hammer blow in effect. The cylinder of composition F (the control) shatters like glass, the cylinder of composition A is compressed to about ⅜ inches long and deforms to a barrel-shape without breaking, showing the greatly superior toughness of the cured resin.

Other glycidyl ethers of the invention are similarly cured to tough resins by this procedure. The resin formed from the epoxy compound of Example 5 is thus comparable to composition B in its properties.

While the above example shows the curing of the glycidyl ethers of the invention employing a hydrazine-group containing curing agent, it will be understood that this is illustrative. Other curing agents such as polyamines, anhydrides, and the like commonly employed for the curing of the convention bisphenol A glycidyl ether and the like are also suitable. The particular curing agent employed will depend upon factors readily known and recognized by those skilled in the art.

What is claimed is:
1. A glycidyl ether having the formula:

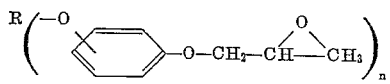

wherein R is an n-valent radical selected from the group consisting of phenylene, phenenyl, biphenylene and diphenyl ether radicals and wherein all valencies from oxygen to carbon atoms of a single ring are attached to non-adjacent carbon atoms; and $n$ is a number of the group consisting of 2 and 3.
2. p,p'-Bis(3-glycidoxyphenoxy)diphenyl ether.
3. p,p'-Bis(4-glycidoxyphenoxy)diphenyl ether.
4. p,p'-Bis(4-glycidoxyphenoxy)biphenyl.
5. 1,4-bis(3'-glycidoxyphenoxy)benzene.
6. 1,3,5-tris(m-glycidoxyphenoxy)benzene.

References Cited by the Examiner

UNITED STATES PATENTS

| | | | |
|---|---|---|---|
| 2,694,694 | 11/1954 | Greenlee | 260—347 |
| 2,723,241 | 11/1955 | De Groote et al. | 252—344 |
| 2,801,989 | 8/1957 | Farnham | 260—348 XR |
| 2,884,462 | 4/1959 | Henry | 260—613 |
| 2,886,600 | 5/1959 | Horsley | 260—613 |
| 3,019,234 | 1/1962 | Korach et al. | 260—348 |
| 3,033,818 | 5/1962 | Price et al. | 260—348 XR |
| 3,035,018 | 5/1962 | Price et al. | 260—348 XR |
| 3,047,588 | 7/1962 | Van Ess | 260—348 |

FOREIGN PATENTS 1,238,643 7/1960 France.

OTHER REFERENCES

Paquin, A. M.: Epoxydverbindungen and Epoxydharze (1958) p. 133.

WALTER A. MODANCE, *Primary Examiner.*

CHARLES B. PARKER, NICHOLAS S. RIZZO,
*Examiners.*